Sept. 13, 1932.  W. A. HANSES  1,877,306
GEOGRAPHICAL GLOBE STRUCTURE
Filed May 29, 1930

Inventor.
William A. Hanses.
By Dyrenforth, Lee, Chritton and Wiles
Attys.

Patented Sept. 13, 1932

1,877,306

UNITED STATES PATENT OFFICE

WILLIAM A. HANSES, OF CHICAGO, ILLINOIS, ASSIGNOR TO RAND McNALLY & COMPANY, OF CHICAGO, ILLINOIS, A CORPORATION OF ILLINOIS

GEOGRAPHICAL GLOBE STRUCTURE

Application filed May 29, 1930. Serial No. 457,057.

My invention relates more particularly to geographical globes mounted preferably to rotate about an axis extending coincident with the polar extremities of the globe and having a dial with hour-indicating markings thereon equidistantly spaced about the circumference of the dial and preferably twenty-four in number to correspond with the twenty-four hours of a day, these markings registering with the terminal ends of the meridian lines of the globe so that by following down the meridian lines the absolute or relative time at any place indicated on the globe may be determined, the dial being rotatable relative to the globe so that the time at any place indicated on the globe relative to another place indicated thereon may be determined.

My primary object is to provide a construction of geographical globe structure having a dial of the character above mentioned whereby mutilating, or otherwise damaging, the surface of the globe in the rotation of the dial, will be prevented.

Referring to the accompanying drawing:

Figure 2 is an enlarged plan view of the dial of Fig. 1 with which is associated means for preventing the rubbing contact referred to.

Figure 1:
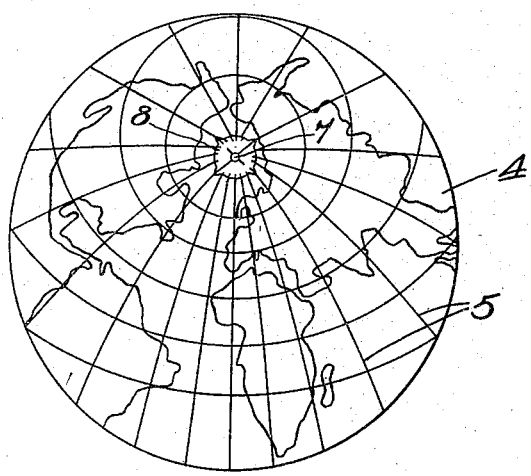
Figure 1 is a plan view of a geographical globe structure constructed in accordance with my invention.
Figure 2:
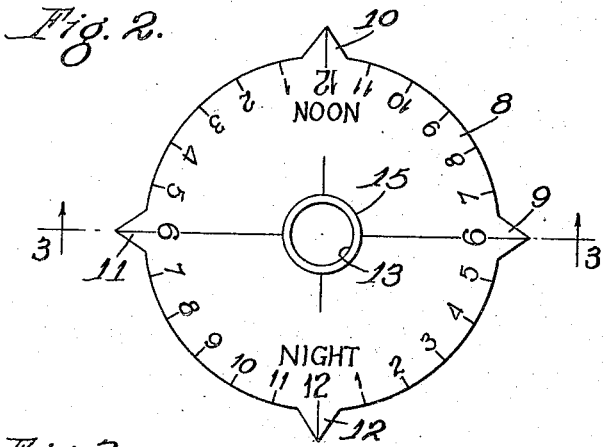
Figure 3:
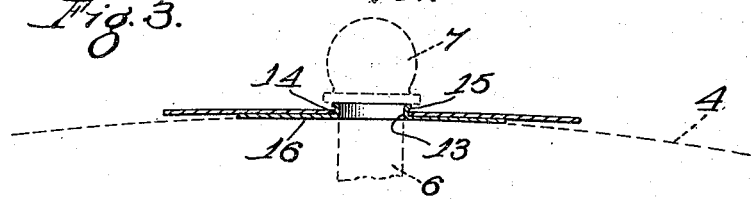
Figure 3, a section taken at the line 3—3 on Fig. 2 and viewed in the direction of the arrows, this view showing, by dotted lines, the rod about which the globe portion of the structure is rotatable.

Referring to the particular construction shown, the geographical globe is represented at 4 and as shown is provided with the meridian lines 5 which converge toward the opposite polar extremities of the globe in accordance with common practice and as shown of the upper polar extremity thereof.

The globe 4 is rotatably supported, as is usual in constructions of this character, to rotate about an upwardly inclined axis, as for example about a rod 6 having a flanged knob portion 7 at its upper end, this rod extending through openings in the globe coincident with the polar extremities thereof and supported, in accordance with common practice, on a base (not shown).

The structure also comprises a dial plate 8 provided about its circumferential margin with twenty-four equidistantly spaced markings numbered in two series each from 1 to 12 and representing a 24-hour day, these markings alining, respectively, with the meridian lines 5 of a corresponding number. The dial plate 8 is preferably provided with four triangular projections 9, 10, 11 and 12, the projections 9 and 11 being in radial alinement with the markings 6, representing six o'clock morning and night, and the projections 10 and 12 radially alining with the markings indicating 12 o'clock noon and night.

The dial 8 is associated with a grommet 13 which extends through a central opening 14 in the dial. The upper edge of the grommet is outwardly turned as represented at 15 to partially overlie the upper surface of the disk 8 and the lower edge of the grommet is formed with an annular flange 16 forming a disklike portion which underlies the disk 8.

The pivoting rod 6 extends through the opening in the grommet, the flanged knob portion 7 opposing the outwardly turned portion 15 of the grommet.

The parts of the structure being assembled as shown, the grommet 13 and the dial plate 8 rotate with the globe 4 when force is applied to the latter in a direction to rotate it. When force is applied directly to the disk 8 for rotating it this disk rotates on the grommet, the latter never rotating except with the globe 4. Thus the dial 8 is rotatable relative to the globe without having rubbing contact therewith, thereby preserving the globe from impairment or marring as would occur were the disk 8 to rotate relative to, and in contact with, the globe.

While I have illustrated and described a particular construction embodying my invention, I do not wish to be understood as intending to limit it thereto as the same may be modified and altered without departing from the spirit of my invention.

What I claim as new, and desire to secure by Letters Patent, is:

1. A geographical globe structure comprising a geographical globe, means for supporting said globe and comprising a rod extending through said globe coincident with its polar extremities, a dial having hour-indicating markings at its circumferential edge, and a grommet through which said rod extends and on which said dial is mounted for rotation relative to said globe, said grommet having a portion spacing said dial from said globe.

2. A geographical globe structure comprising a geographical globe, means pivoting said globe to turn on an axis coincident with its polar extremities, a dial located coincident with one of said polar extremities and having hour-indicating markings at its circumferential edge, and a grommet through which said pivoting means extends and on which said dial is rotatable relative to said globe, said grommet having a portion spacing said dial from said globe.

3. A geographical globe structure comprising a geographical globe, means pivoting said globe to turn on an axis coincident with its polar extremities, a dial located coincident with one of said polar extremities and having hour-indicating markings at its circumferential edge, and a grommet through which said pivoting means extends and on which said dial is rotatable relative to said globe, the inner end of said grommet being enlarged to provide a disk portion which extends between said dial and globe.

4. A geographical globe structure comprising a geographical globe, means pivoting said globe to turn on an axis coincident with its polar extremities, a dial located coincident with one of said polar extremities and having hour-indicating markings at its circumferential edge, and a grommet through which said pivoting means extends and on which said dial is rotatable relative to said globe, said grommet having a portion spacing said dial from said globe, said grommet and dial rotating with said globe when force for turning the latter is applied thereto.

5. A geographical globe structure comprising a geographical globe, means pivoting said globe to turn on an axis coincident with its polar extremities, a dial located coincident with one of said polar extremities and having hour-indicating markings at its circumferential edge, and a grommet through which said pivoting means extends and on which said dial is rotatable relative to said globe, said grommet having a portion spacing said dial from said globe and said grommet being held to said globe to rotate therewith whereby said grommet and dial rotate with said globe when force for turning the latter is applied thereto.

WILLIAM A. HANSES.